(12) United States Patent
Eymery et al.

(10) Patent No.: US 9,706,203 B2
(45) Date of Patent: Jul. 11, 2017

(54) LOW LATENCY VIDEO ENCODER

(71) Applicant: Allegro DVT, Meylan (FR)

(72) Inventors: Pascal Eymery, Saint Martin d'Heres (FR); Christophe Chong-Pan, Grenoble (FR)

(73) Assignee: Allegro DVT, Meylan (FR)

( * ) Notice: Subject to any disclaimer, the term of this patent is extended or adjusted under 35 U.S.C. 154(b) by 1 day.

(21) Appl. No.: 14/805,120

(22) Filed: Jul. 21, 2015

(65) Prior Publication Data
US 2016/0029020 A1    Jan. 28, 2016

(30) Foreign Application Priority Data
Jul. 25, 2014 (FR) ..................... 14 57231

(51) Int. Cl.
| | | |
|---|---|---|
| G06K 9/36 | (2006.01) |
| H04N 19/115 | (2014.01) |
| H04N 19/124 | (2014.01) |
| H04N 19/139 | (2014.01) |
| H04N 19/142 | (2014.01) |
| H04N 19/149 | (2014.01) |
| H04N 19/174 | (2014.01) |
| H04N 19/61 | (2014.01) |
| H04N 19/146 | (2014.01) |
| H04N 19/152 | (2014.01) |

(52) U.S. Cl.
CPC ......... *H04N 19/115* (2014.11); *H04N 19/124* (2014.11); *H04N 19/139* (2014.11); *H04N 19/142* (2014.11); *H04N 19/146* (2014.11); *H04N 19/149* (2014.11); *H04N 19/152* (2014.11); *H04N 19/174* (2014.11); *H04N 19/61* (2014.11)

(58) Field of Classification Search
CPC .. H04N 19/115; H04N 19/124; H04N 19/139; H04N 19/142; H04N 19/149; H04N 19/174; H04N 19/61
See application file for complete search history.

(56) References Cited

U.S. PATENT DOCUMENTS

| | | |
|---|---|---|
| 5,949,490 A | 9/1999 | Borgwardt et al. |
| 6,151,442 A * | 11/2000 | Ueno ............... G10L 19/032 386/327 |

(Continued)

FOREIGN PATENT DOCUMENTS

WO    WO 2009157827 A1    12/2009

OTHER PUBLICATIONS

French Search Report dated May 13, 2015 from corresponding French Application No. 14/57231.

(Continued)

*Primary Examiner* — Amir Alavi
(74) *Attorney, Agent, or Firm* — Wolf, Greenfield & Sacks, P.C.

(57) ABSTRACT

The invention concerns a method comprising: encoding, by a video encoder and based on a first quantization factor (QP), one or more first groups of image blocks of a video frame; estimating, by a processing device, the size of an image slice comprising a plurality of further groups of image blocks to be encoded; and determining, based on the estimated size of the image slice, a second quantization factor (QP) to be applied to one or more of the further groups.

17 Claims, 4 Drawing Sheets

(56) References Cited

U.S. PATENT DOCUMENTS

| | | | | |
|---|---|---|---|---|
| 7,042,941 | B1* | 5/2006 | Laksono | H04N 19/159 375/240.03 |
| 7,046,173 | B2* | 5/2006 | Champion | H03M 7/3042 341/143 |
| 7,936,816 | B2* | 5/2011 | Sostawa | H04N 19/176 375/240.03 |
| 8,200,034 | B2* | 6/2012 | Shi | G06T 7/0004 382/250 |
| 2003/0007559 | A1* | 1/2003 | Lallet | H04N 19/159 375/240.03 |
| 2004/0247187 | A1* | 12/2004 | Tanaka | H04N 19/159 382/232 |
| 2006/0233237 | A1 | 10/2006 | Lu et al. | |
| 2016/0029020 | A1* | 1/2016 | Eymery | H04N 19/115 382/251 |

OTHER PUBLICATIONS

French Search Report dated Apr. 30, 2015 from potentially related French Application No. 14/57229.

Myoung-Jin Kim et al: *Adaptive Rate Control Based on Statistical Modeling in Frame-layer for H.264/AVC*, Advanced Communication Technology (ICACT), 2011 13th International Conference on, IEEE, Feb. 13, 2011, pp. 680-683, XP032013153.

Miryem Hrarti et al: *A New approach of Rate-Quantization Modeling for Intra and Inter Frames in H.264 Rate Control*, Signal and Image Processing Applications (ICSIPA), 2009 IEEE International Conference on, IEEE, Piscataway, NJ, Nov. 18, 2009, pp. 474-479, XP031685407.

Yongqiang Bai et al: *Improved Bit-allocation and Rate-control Algorithm Based on TM5*, Signal Processing, 2008. ICSP 2008. 9th International Conference on, IEEE, Piscataway, NJ, USA, Oct. 26, 2008, pp. 1916-1919, XP031369438.

W-N Lie et al: *Two-Pass Rate-Distortion Optimized Rate Control Technique for H.264/AVC Video*, Visual Communications and Image Processing; Dec. 7, 2005- Jul. 15, 2005 Beijing, Jul. 12, 2005, XP030080948.

Parisa Sha'afi Kabiri et al: *An Adaptive Fast Bitrate Shaping Scheme for H.264/AVC Rate Control*, Broadband Multimedia Systems and Broadcasting (BMSB), 2012 IEEE International Symposium on, IEEE, Jun. 27, 2012, pp. 1-5, XP032222341.

U.S. Appl. No. 14/805,152, filed Jul. 21, 2015, Eymery et al.

\* cited by examiner

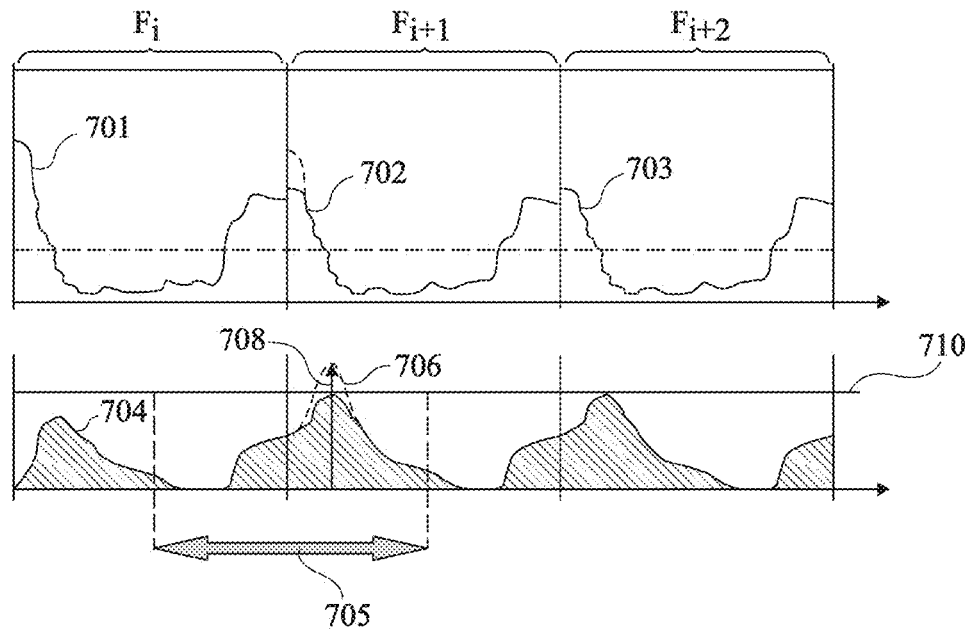
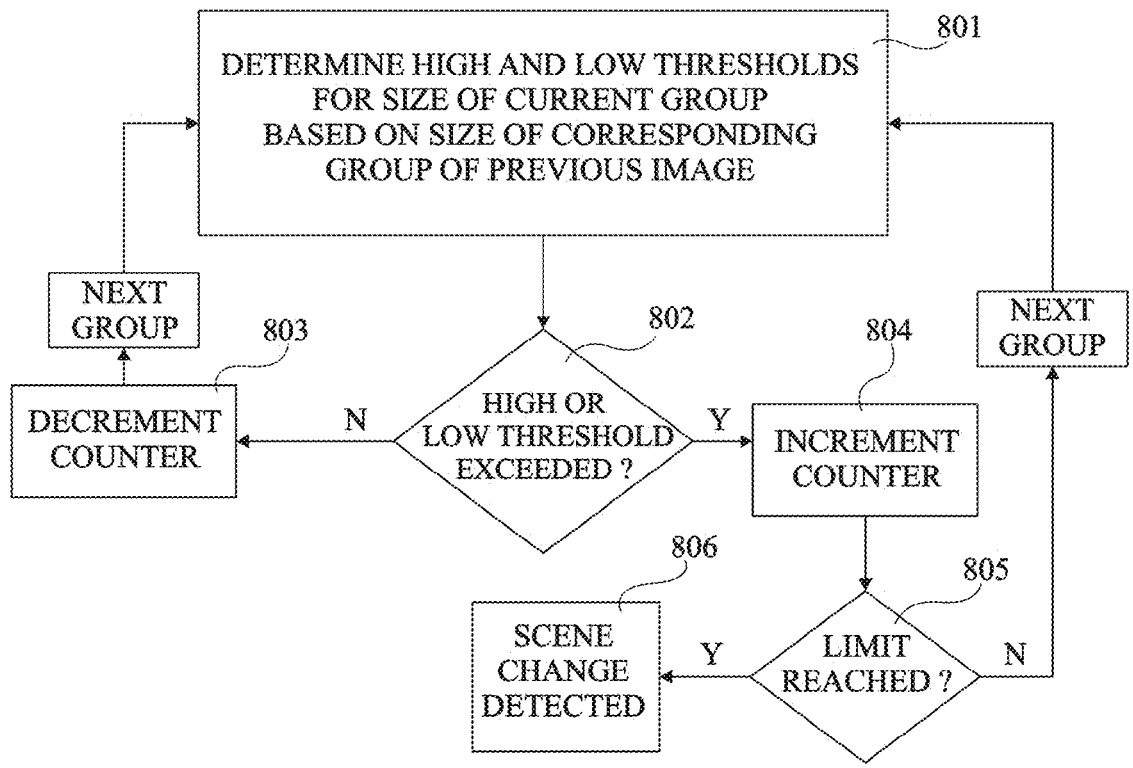
Fig 7B
Fig 8

LOW LATENCY VIDEO ENCODER

CROSS REFERENCE TO RELATED APPLICATIONS

This Application claims priority to French Application 14/57231, filed Jul. 25, 2014, entitled "LOW LATENCY ENCODER" which is incorporated herein by reference to the maximum extent allowable by law.

FIELD

The present disclosure relates to the field of video encoding, and in particular to a low latency video encoder and method of video encoding.

BACKGROUND

In certain applications, there is a need for low latency video transmission between a video source and a video display. For example, it may be desirable that video frames captured by a camera are displayed almost instantaneously on a display positioned several meters or more from the camera. Such an arrangement could correspond to a visual aid for the driver of a vehicle to enable blind spots to be seen, for example when reversing the vehicle.

While techniques can be used to achieve relatively low transmission times over a wired interface, such as a serial interface, there are challenges in reducing the latency in the video transmission, in other words the time required for video encoding, transmission and decoding, while maintaining an acceptable video quality.

There is thus a need in the art for a device and method for encoding a video signal that results in a reduced latency for the video transmission and decoding operations.

SUMMARY

It is an aim of embodiments of the present invention to at least partially address one or more needs in the prior art.

According to one aspect, there is provided a method comprising: encoding, by a video encoder and based on a first quantization factor, one or more first groups of image blocks of a first video frame; estimating, by a processing device, the size of an image slice comprising a first plurality of further groups of image blocks to be encoded; and determining, based on the estimated size of the image slice, a second quantization factor to be applied to one or more of the further groups of the first plurality of further groups. For example, the size of the image slice is the number of bits of the image slice.

According to one embodiment, the image slice is a sliding window comprising a fixed number $N_G$ of further groups of image blocks to be encoded, wherein $N_G$ is an integer equal to 2 or more.

According to one embodiment, the one or more first groups of image blocks are stored in a buffer, and the method further comprises predicting the occurrence of buffer overflow in the buffer based on the estimated size of the sliding window.

According to one embodiment, the further groups of image blocks of the image slice comprise at least one group of image blocks of the first video frame and at least one group of image blocks of a second video frame following the first video frame.

According to one embodiment, the method further comprises: encoding, based on the second quantization factor, the one or more further groups of image blocks of the first plurality of image blocks; and estimating, by the processing device, a new size of the sliding window comprising a second plurality of $N_G$ further groups of image blocks to be encoded; and determining, based on the estimated new size of the sliding window, a third quantization factor to be applied to one or more of the further groups of the second plurality of further groups.

According to one embodiment, the first video frame comprises N groups of image blocks, N being equal to 3 or more, and the further groups of the first plurality comprise N' groups, where N' is less than N.

According to one embodiment, estimating the size of the image slice comprises estimating the size of each of the first plurality of further groups of image blocks.

According to one embodiment, the size of each of the further groups of image blocks is estimated based on the size of the first group of image blocks.

According to one embodiment, the size of each of the further groups of image blocks of the first plurality is estimated by: identifying, for each further group of image blocks, a corresponding group of image blocks in a previous video frame; and estimating the size of each further group of image blocks based on the size of its corresponding group of image blocks in the previous frame and on the quantization factor that was used to encode the corresponding group of image blocks.

According to one embodiment, estimating the size of each of the further groups of image blocks is based on the equation:

$$\text{Predicted\_Group\_Size}[g] = \text{Old\_Group\_Size}[g] \times 2^{\left(\frac{\text{Old\_Group\_QP}(g) - \text{NewQP}}{6}\right)}$$

where Predicted_Group_Size[g] is the size estimation of the further group g, Old_Group_Size[g] is the size of the corresponding group of image blocks in the previous frame, Old_Group_QP(g) is the quantization factor that was used to encode the corresponding group of image blocks, and NewQP is the first quantization factor.

According to one embodiment, for each further group of image blocks, the corresponding group of image blocks is the group of the previous frame having the same position in the image as the further group.

According to one embodiment, for each further group of image blocks, the corresponding group of image blocks in the previous frame is identified based on one or more motion vectors between image blocks of the previous video frame and image blocks of the video frame.

According to one embodiment, the one or more first image blocks are stored in a buffer, and wherein the method further comprises predicting the occurrence of buffer overflow in said buffer based on the predicted size of said further groups of image blocks within a sliding window to be encoded.

According to one embodiment, determining the second quantization factor comprises comparing the estimated size of the image slice with an image slice size limit, and reducing or increasing the first quantization factor based on the comparison.

According to one embodiment, the method further comprises: detecting by the processing device whether or not a scene change occurred between the video frame and a previous video frame by comparing the size of the first group of image blocks with at least one threshold determined based on the size of a group of image blocks in a previous frame corresponding to the first group; if a scene change is not detected, estimating the size of each further group of image blocks based on the size of a corresponding group of image blocks in the previous video frame; and if a scene change is detected, estimating the size of each further group of image blocks based on the size of one or more encoded groups of image blocks of the current video frame.

According to one embodiment, each group of image blocks comprises one or more image blocks.

According to one embodiment, each video frame comprises N groups of image blocks, and wherein the video slice comprises N groups of image blocks.

According to a further aspect, there is provided a processing device adapted to: estimate, based on a first quantization factor used to encode one or more first groups of image blocks of a first video frame, the size of an image slice comprising a first plurality of further groups of image blocks to be encoded; and determine, based on the estimated size of the image slice, a second quantization factor to be applied to one or more of the further groups of the first plurality. For example, the size of the image slice is the number of bits of the image slice.

According to a further aspect, there is provided a video transmission circuit comprising: a video encoder adapted to compress a video signal based on quantization parameter; the above processing device for providing the quantization parameter; and an output buffer for storing the compressed video signal.

According to a further aspect, there is provided a video transmission system comprising: the above video transmission circuit, wherein the video signal is provided by a capture device; a receive circuit coupled to the video transmission circuit by a transmission interface, the receive circuit comprising: an input buffer for receiving the compressed video signal; a decoder for decoding the compressed video signal to generate a decompressed video signal; and a display for displaying the decompressed video signal.

BRIEF DESCRIPTION OF THE DRAWINGS

The foregoing and other features and advantages will become apparent from the following detailed description of embodiments, given by way of illustration and not limitation with reference to the accompanying drawings, in which:

FIG. 7B is a timing diagram illustrating predicted sizes of groups of image blocks and output buffer levels during consecutive frames according to an example embodiment; and FIG. 8 is a flow diagram showing operations in a method of detecting a scene change according to an example embodiment.

DETAILED DESCRIPTION

While in the following description the particular encoding standard used to compress the video data has not been described in detail, it will be apparent to those skilled in the art that the embodiments described herein could be applied to a wide range of video compression standards, such as the H.264 ISO standard MPEG4 AVC, the MPEG-2 video standard, the VP8 and VP9 standard, or the MPEG HEVC (High Efficiency Video Coding) standard.

Figure 1:
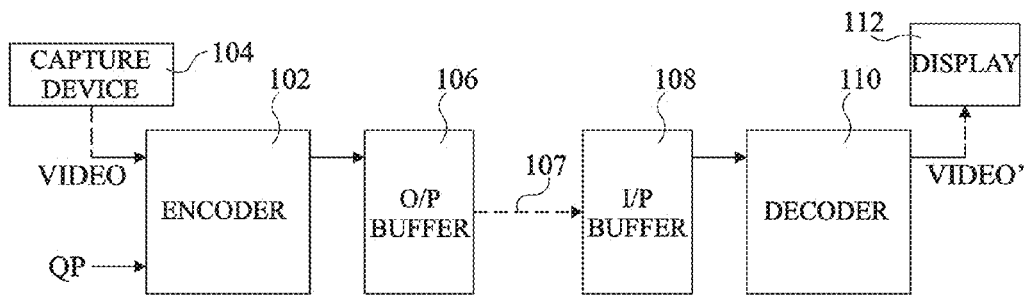
FIG. 1 schematically illustrates a video transmission system according to an example embodiment.

FIG. 1 schematically illustrates a video transmission system according to an example embodiment.

On a transmission side, the system comprises an encoder (ENCODER) 102, which receives frames of an uncompressed video signal (VIDEO), and encodes the frames based on a quantization parameter QP. As known to those skilled in the art, the quantization parameter determines the compression rate used by the encoder for encoding at least some of the video data, and thus influences the number of bits of encoded data for a given number of bits of input data. The lower the QP, the greater will be the number of bits of each compressed frame, and thus the video signal that will be retrieved after decoding will generally be of a higher quality. Conversely, increasing the QP will cause the number of bits to be reduced, and will often lead to a reduction in video quality.

For example, according to the H.264 ISO standard, the quantization parameter is a value of between 0 and 51, which determines the quantizer step size. The relation between the QP and the compression rate is logarithmic. In many cases, a general rule can be assumed according to which, when the QP reduces by 6 units, the number of bits of encoded data doubles.

Other encoding standards may use other types of quantization parameters to determine, to at least some extent, the compression rate that is applied while encoding the video signal.

Referring again to FIG. 1, the video signal to be encoded by the encoder 102 is received from a capture device (CAPTURE DEVICE) 104, for example a camera, on the transmission side. Alternatively, the video data could be stored in a memory (not shown in FIG. 1) on the transmission side and retrieved from the memory by the encoder 102.

The encoder 102 for example provides a compressed output video stream to an output buffer (O/P BUFFER) 106 of the transmission side, which stores the data packets of compressed video until they can be transmitted over a transmission interface 107. The transmission interface 107 is for example a wired interface, such as a serial interface. Alternatively, in some embodiments, the transmission interface 107 could be a wireless interface. The length of the transmission interface 107, in other words the distance separating the transmission and receive sides of the system, could be anything from a few tens of centimeters, for example 50 cm, to tens of meters or more, depending on the application. In some cases, the transmission interface 107 could include one or more intermediate networks, including the internet. Furthermore, the video data stored in the output buffer 106 could be in the form of a file, which could be saved to a memory card before being transmitted.

Transmission of the compressed video data is for example performed at a constant bitrate, determined by the capabilities of the transmission interface 107.

On the receive side, the compressed video data is for example received by an input buffer (I/P BUFFER) 108. The compressed video data is then read from the input buffer 108 by a decoder (DECODER) 110, which decodes the video stream to provide an uncompressed video signal VIDEO', which will generally be a slightly degraded version of the original signal VIDEO. In some embodiments, the decoded video is displayed on a display (DISPLAY) 112 on the receive side.

Figure 2A:
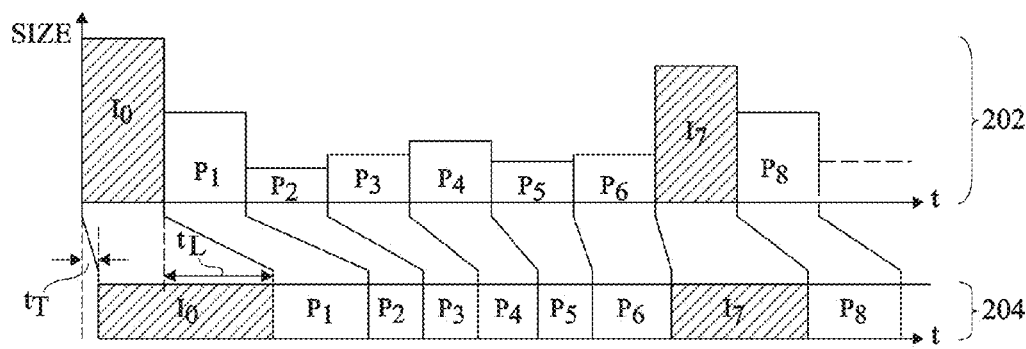
FIG. 2A is a timing diagram representing an example of compression and transmission of video frames of a video sequence without low-latency control.

FIG. 2A is a timing diagram illustrating the timing of encoding, transmission and decoding of video frames of a video sequence according to an example in which no low latency rate control is implemented.

The top part 202 of the timing diagram illustrates an example of the sequence of video frames to be encoded and stored in the output buffer 106 of FIG. 1. The frames are labelled from left to right $I_0$, $P_1$ to $P_6$, $I_7$ and $P_8$, where the frames labelled I are shaded and for example correspond to intra-coded frames that can be decoded without using information from other frames, whereas the frames labelled P correspond to inter-predicted frames for which decoding relies heavily on one or more previous frames. Each frame is represented by a rectangle having a height that represents its size, in other words its number of bits. The intra frames $I_0$ and $I_7$ are for example the largest frames. The widths of the rectangles represent the capturing and encoding duration. This duration is the same for each rectangle, as the frames for example arrive at the encoder 102 from the capture device 104 at a constant frame-rate.

The bottom part 204 of the timing diagram of FIG. 2A illustrates an example of the transmission time of each frame, the frames being transmitted at a constant rate. Thus, the largest frames take the longest time to be transmitted. Decoding the first frame $I_0$ starts a time delay $t_T$ after the first part of this frame becomes available in the input buffer 108, due for example to the delay introduced by the physical transmission interface 107, which is for example in the order of a few milliseconds. However, the overall latency $t_L$ of the first frame is for example determined by the delay between the time that it is completely available in the output buffer 106 and the time that it has been completely read and decoded from the input buffer 108, this delay being labelled $t_L$ in FIG. 2A. As illustrated, due to the size of the frame $I_0$, this overall latency is far greater than the latency due to physical transmission delays, and could be as high as 100 ms or more in some cases.

Figure 2B:
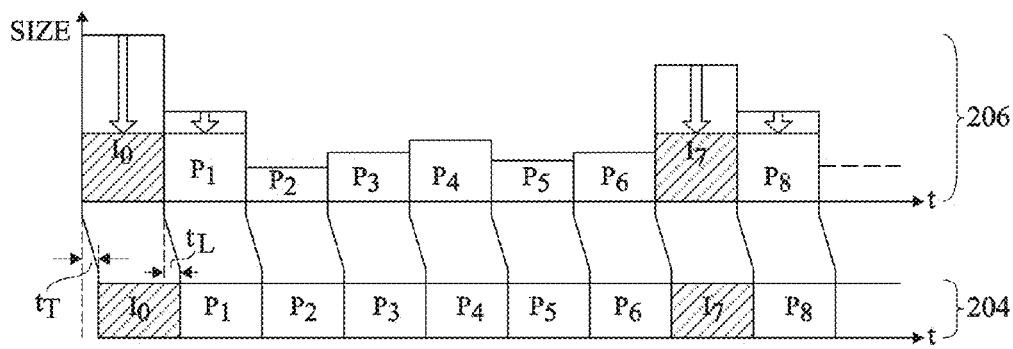
FIG. 2B is a timing diagram representing an example of low-latency compression and transmission of video frames of a video sequence according to an example embodiment.

FIG. 2B is a timing diagram illustrating the timing of transmission and decoding of video frames of a video sequence according to an example in which rate control is implemented as will be described herein after.

The top part 206 of the timing diagram is substantially the same as the top part 202 of FIG. 2A, except that the size of at least some of the frames has been limited. For example, the intra frames $I_0$ and $I_7$ and the predicted frames $P_1$ and $P_8$ have had their sizes limited to be much closer to the average frame size. As will be explained in more detail below, limiting the frame size in this way is for example achieved by adapting the quantization parameter QP used during the encoding operation.

The bottom part 208 of the timing diagram shows the result of limiting the size of the frames, which is that the time to transmit each frame to the input buffer 108 on the receive side becomes relatively constant, and substantially equal to the time that was taken to encode and load the frames into the output buffer 106 on the transmission side. The overall latency $t_L$ is thus not much higher than the delay $t_T$ representing physical transmission delays.

Figure 3:
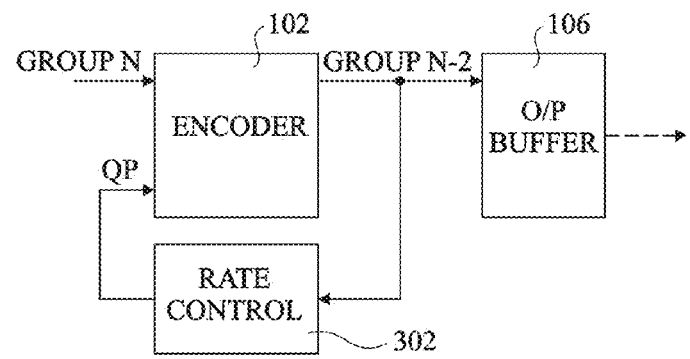
FIG. 3 schematically illustrates a transmission circuit of the system of FIG. 1 in more detail according to an example embodiment.

FIG. 3 schematically illustrates the transmission side of the video transmission system of FIG. 1 in more detail according to an example embodiment. As illustrated, the encoder 102 for example processes the video frames in groups of image blocks. As used herein, the term image block designates a block of pixels, for example corresponding to a macro block according to the H.264 standard, or to a coding unit according to the HEVC standard. Each group comprises a plurality of image blocks, and for example at least five image blocks. Furthermore, each group of image blocks is for example at most the size of one row of the image.

A rate control block (RATE CONTROL) 302 is provided, for example implemented by a hardware circuit such as an ASIC (application specific integrated circuit) or FPGA (field-programmable integrated circuit). Alternatively, the functions of the rate control block 302 could be implemented at least partially in software, in other words by a processing device under the control of instructions stored in an instruction memory.

The rate control block 302 determines, based on the size of one or more encoded groups of image blocks and on an estimation of the size of one or more future groups to be encoded, the quantization parameter (QP) to be applied to a later group in order to prevent a frame size limit from being exceeded. For example, the frame size limit is defined as being equal to the bitrate that data can be processed on the receive side, divided by the frame rate. For example, for a bit rate of 10 Mb/s, and a frame rate of 20 f/s, the frame size limit is for example 500 k bits. The term "size" as employed herein for example corresponds to a number of bits.

According to the embodiments described herein, the size estimation is performed for an image slice, which for example comprises at least one group of a plurality of image blocks, and at most the same number of groups of image blocks as a frame. There are for example an integer number of groups of image blocks in each line of the image. Thus a size limit for the image slice can be determined based on the frame size limit. For example, the size limit is determined based on the following equation:

$$\text{Size Limit} = \frac{\text{Bit\_rate}}{\text{Frame\_rate}} \times \frac{\text{Image\_slice\_size}}{\text{Frame\_size}}$$

where Frame_size is for example the number of image blocks in each frame, and Image_slice_size is the number of image blocks in each slice.

If the image slice size limit is exceeded, the quantization parameter is for example increased. If the image slice size limit is not exceeded, the quantization parameter is for example kept constant or reduced.

In the example of FIG. 3, the new quantization parameter is applied to an nth group (GROUP N), based on the size of a (n−2)th group (GROUP N−2). Indeed, once the (n−2)th group becomes available, the rate control block 302 determines the new QP while the (n−1)th group is being encoded, and applies it to the (n)th group. However, in alternative embodiments, the new QP may be available earlier, in which case it could be determined based on the (n−1)th group and applied to the nth group.

Figure 4:
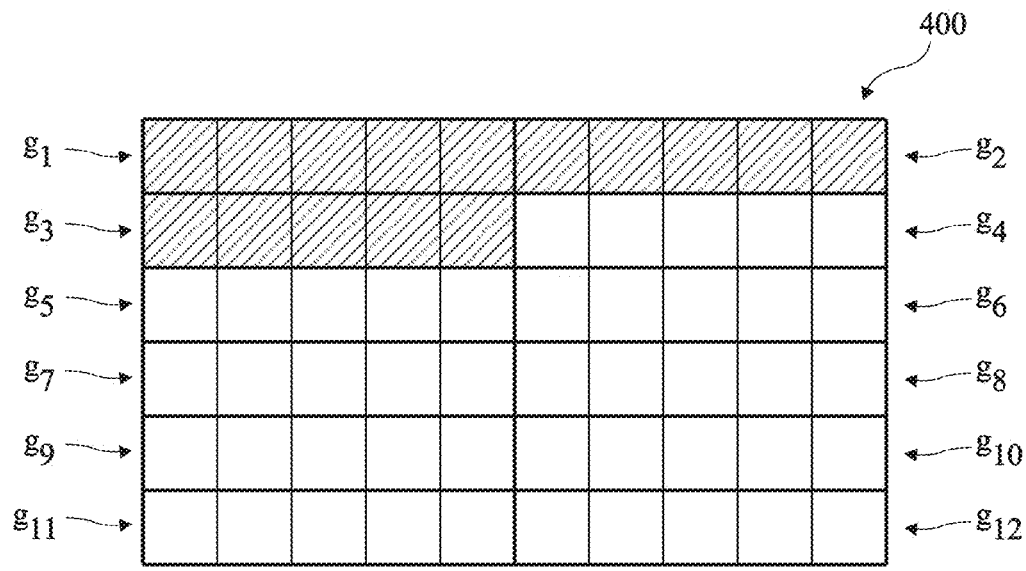
FIG. 4 is a diagram representing an image frame according to an example embodiment.

FIG. 4 illustrates an example of a video frame 400 formed of 60 image blocks, represented by squares, arranged in six rows and ten columns. In the example of FIG. 4, the frame is divided into 12 groups of image blocks g1 to g12, each having the size of five consecutive image blocks.

In the example of FIG. 4, a first three groups g1, g2 and g3 of the frame have been already been encoded, and the other groups g4 to g12 remain to be encoded. The QP to be applied to the group g5 is for example determined based on an estimation of the size of an image slice, which for example corresponds to a video frame in the example of FIG. 4. The size of an image slice is for example estimated based on sizes of the groups that have already been encoded, e.g. the groups g1 to g3 in FIG. 4, and on an estimation of the size of each of the remaining groups in the slice, e.g. the groups g4 to g12 in FIG. 4.

For example, the estimated size (Predicted_Size) of the slice is determined based on the following equation (Equation 1):

$$\text{Predicted\_Size} = \left(\frac{\text{Current\_Size}}{N_{GE}}\right) \times N_G$$

where Current_Size is the size of one or more groups of image blocks already encoded, $N_{GE}$ is number of groups already encoded, and $N_G$ is the total number of groups in the slice.

In an alternative embodiment, the size of the slice is estimated based on the following equation (Equation 2):

$$\text{Predicted\_Size} = \text{Current\_Size} + \text{Last\_Group\_Size} \times N_{GR}$$

where Last_Group_Size is the size of the last group to be encoded, and $N_{GR}$ is number of remaining groups, for example defined as $N_{GR} = N_G - N_{GE}$. In other words, the estimation is based on the latest group to be encoded, which is likely to best reflect the size of the subsequent groups of the image.

According to yet a further embodiment, there are two or more groups of image blocks per row of the image, meaning that the image comprises two or more columns of groups, and the size of the slice is estimated based on the following equation (Equation 3):

$$\text{Predicted\_Size} = \text{Current\_Size} + \sum_{c=0}^{C} \sum_{i=0}^{N_C} \text{Last\_Group\_Size}[c]$$

where C is the number of columns of groups, in other words the number of groups in each row, $N_C$ is the number of remaining groups in the column c to be encoded, and Last_Group_Size of the column c is the size of the latest group of the column c that was encoded.

According to yet a further embodiment described in more detail below, the size of the slice is estimated by estimating the size of the groups to be encoded based on corresponding groups in a previous frame. For example, the slice size is estimated based on the following equation (Equation 4):

$$\text{Predicted\_Size} = \text{Current\_Size} + \sum_{g=n+1}^{N} \text{Predicted\_Group\_Size}[g]$$

where N is the total number of groups of the slice to be encoded, n is the index of the current group and the Predicted_Group_Size for each group g is for example determined based on the equation (Equation 5):

$$\text{Predicted\_Group\_Size}[g] = \text{Old\_Group\_Size}[g] \times 2^{\left(\frac{\text{Old\_Group\_QP}(g) - \text{NewQP}}{6}\right)}$$

wherein Old_Group_Size[g] is the size of a group corresponding to group g in the previous frame, Old_Group_QP is the QP that was used to encode the corresponding group, and NewQP is a current QP, for example the QP used to encode the latest group of image blocks. The ratio 1/6 in this equation assumes that when the QP reduces by 6 units, the number of bits of encoded data doubles. If another relation is true, a different ratio could be used.

The corresponding group is for example identified as the one located in the same position in the previous frame as the group g in the current frame. Alternatively, the corresponding group is identified based on one or more motion vectors between image blocks of group g and image blocks of the previous frame. In other words, the corresponding group can be identified as the one that, after application of one or more motion vectors, is located at the location of group g in the current frame.

Each image slice for example corresponds to a frame of the video signal. Alternatively, the image slice could be of a smaller size.

Figure 5:
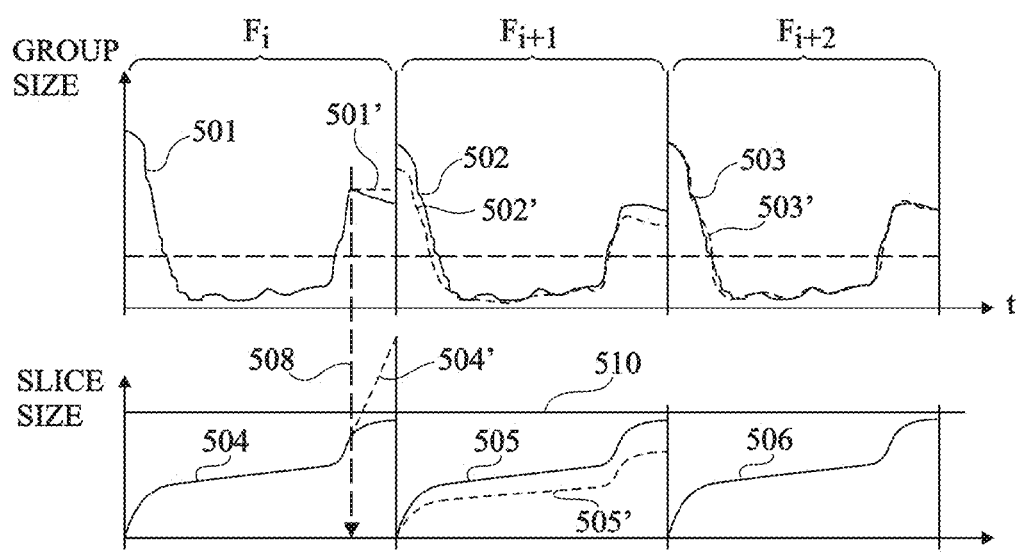
FIG. 5 is a timing diagram illustrating predicted sizes of groups of image blocks and predicted slice sizes during consecutive frames according to an example embodiment.

FIG. 5 is a timing diagram showing, in a top portion of the diagram, curves 501, 502 and 503 respectively representing sizes of groups of image blocks over three consecutive frames $F_i$, $F_{i+1}$ and $F_{i+2}$. In this example, the frames are of a similar scene without a scene change. Thus the curves 501, 502 and 503 have relatively similar forms to each other. The dashed line curves 501', 502' and 503' illustrate predicted group sizes for the three frames respectively.

A lower portion of the timing diagram in FIG. 5 illustrates, for each frame, curves 504, 505 and 506 respectively representing the cumulative group sizes in the frames $F_i$, $F_{i+1}$ and $F_{i+2}$, equal to the sum of the sizes of the previous groups of image blocks in the frame that have already been encoded. Dashed line curves 504' and 505' illustrate the cumulative size based on the predicted group sizes for the frames $F_i$ and $F_{i+1}$.

It is assumed that, at a current time represented by a dashed arrow 508 partway through the frame $F_i$, the predicted sizes of the group of image blocks represented by dashed line 501' will cause a target slice size represented by a line 510 in FIG. 5 to be exceeded, as shown by the dashed line 504'. Therefore, the quantization parameter QP is for example increased in order to reduce the remaining size of the groups of image blocks and bring the slice size back within the target slice size. During the subsequent frame $F_{i+1}$, the slice size based on the new QP is then predicted to be lower than the target slice size, as represented by the dashed line cumulative curve 505'. Thus the QP is reduced to bring the slice size closer to the target level, as shown by the curve 505.

Figure 6:
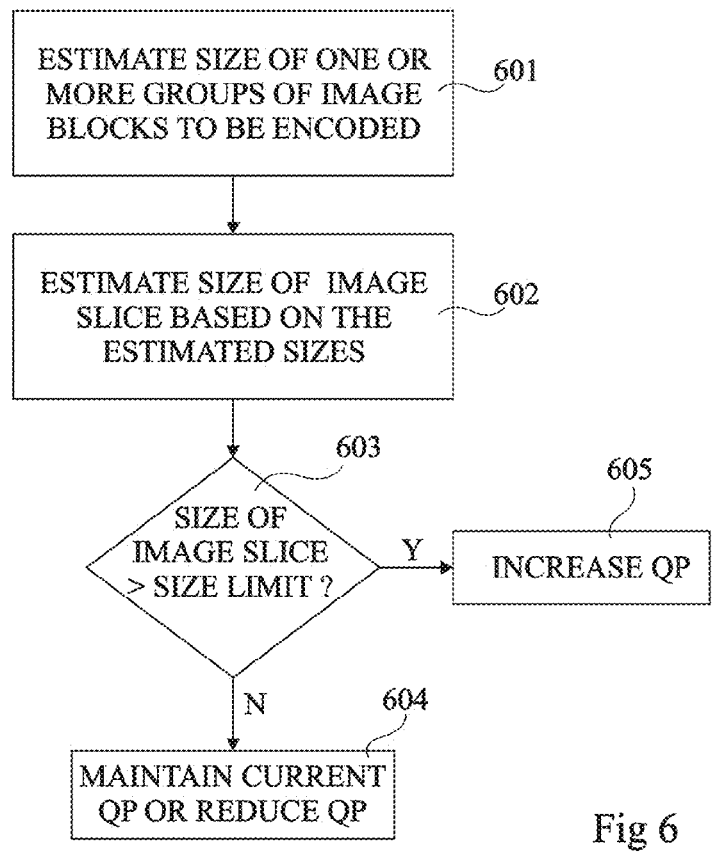
FIG. 6 is a flow diagram showing operations in a method of video encoding according to an example embodiment.

FIG. 6 is a flow diagram illustrating operations in a method of adapting the bit rate of a video encoder. It is assumed that the encoder receives uncompressed frames of a video signal, and that one or more groups of image blocks of a first frame are encoded based on a default quantization parameter, which is for example chosen to be relatively low.

In a first operation 601 of FIG. 6, the sizes of one or more groups of image blocks of the image slice that are to be encoded are estimated, for example, based on an average of the previously encoded groups (equation 1 above), based on the size of the latest encoded group (equation 2 or 3 above), or based on corresponding groups of a previous frame (equation 4 and 5 above).

In a subsequent operation 602, the size of the image slice is estimated based on the estimate of the groups of image blocks to be encoded, and for example based on the size of any groups of the image slice that have already been encoded.

In a subsequent operation 603, the estimated size of the image slice is compared to a size limit. As indicated above, the size limit is for example determined based on the bitrate that data is processed on the receive side, and on the frame rate.

If in operation 603 it is found that the size limit is exceeded, the QP is increased in an operation 605. For example, the QP is incremented by a single unit, or increased by an amount based on how much the size limit was exceeded.

Alternatively, if in operation 603 it is found that the size limit is not exceeded, the QP is maintained at its current level, or reduced. For example, if the slice size is within a certain percentage of the limit, the current QP is maintained, whereas if the slice size is lower than that, the QP is for example decremented by one or more units based on how far the size is from the limit.

In some embodiments, the method used in operation 601 to estimate the size of one or more groups of images may be based on the detection of a scene change between the previous frame and the current frame. Indeed, whereas the method of equation 4 above is particularly well adapted when consecutive frames of the video signal are relatively similar to each other, in the case of a scene change, another method may be better adapted.

In addition to adapting the slice size as described above, buffer overflow protection may be implemented in some embodiments, as will now be described with reference to FIGS. 7A and 7B.

Figure 7A:
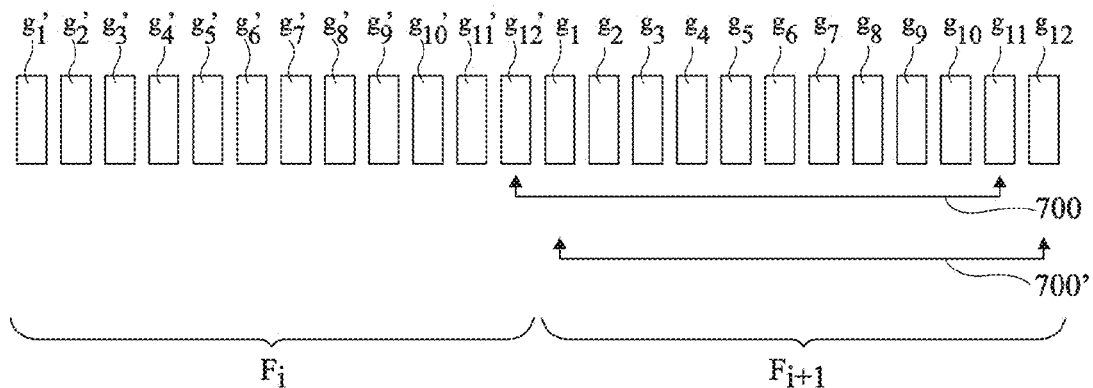
FIG. 7A is a diagram representing a sequence of groups of image blocks of consecutive frames according to an example embodiment.

FIG. 7A is a diagram representing an example embodiment in which the image slice corresponds to a sliding window 700 of image blocks is used to predict whether a buffer overflow will occur. The image slice thus for example has a size $N_G$ that remains constant irrespective of the number of groups of image blocks of a given frame that have already been encoded. Furthermore, an image slice may thus include groups of image blocks from two consecutive frames. In some embodiments the size $N_G$ is equal to the number N of groups of image blocks in each frame.

As illustrated, a current frame $F_i$ comprises groups g1' to g12' of image blocks, and a subsequent frame $F_{i+1}$ comprises groups g1 to g12. It is assumed that the last group g12' of the current frame $F_i$ has just been encoded, and the sliding window corresponds to the group g12', and to the groups g1 to g11 of the next frame. The occurrence of a buffer overflow is for example predicted by predicting the buffer level after each group of image blocks in the sliding window has been processed. For example, the prediction for an nth group of image blocks of the sliding window 700 is based on the following equations (Equations 6):

Predicted_Buffer_Level[0]=Current_Buffer_Level

Predicted_Buffer_Level[$n$]=Max(0;Predicted_Buffer_Level[$n$−1]+Predicted_Group_Size[$g$+$n$−1]−Size_Limit/Number_of_group where Current_Buffer_Level is the number of bits currently stored in the output buffer, Predicted_Group_Size[g+n] is the predicted group size as determined by equation 5 above, assuming that group g is the first group of the sliding window, and Size_Limit/Number_of_group corresponds to the number of bits removed from the buffer when the nth group is processed. Assuming in the example of FIG. 7A that the group g11' has just been encoded, this estimation for example allows an updated QP to be found for use for the subsequent group g12' of the image $F_i$.

For the subsequent group of image blocks, i.e. once the group g12' of the frame $F_i$ has been encoded, the sliding window shifts forwards one group as shown by the window labelled 700', to comprise the groups g1 to g12 of the frame $F_{i+1}$. The sizes of the groups g1 to g12 of the sliding window 700' are for example estimated based on the sizes of the previously encoded groups g1' to g12' respectively, in accordance with equation 5 above.

FIG. 7B is timing diagram showing, in a top portion of the diagram, curves 701, 702 and 703 respectively representing sizes of groups of image blocks over three consecutive frames $F_i$, $F_{i+1}$ and $F_{i+2}$. FIG. 7B also illustrates in a lower portion an example of the output buffer levels in the output buffer 106 over the three consecutive frames $F_i$, $F_{i+1}$ and $F_{i+2}$. As with the example of FIG. 5, the frames in FIG. 7B are of a similar scene without a scene change. Thus the curves 701, 702 and 703, which respectively represent the sizes of the groups of image blocks in the frames $F_i$, $F_{i+1}$ and $F_{i+2}$, have relatively similar forms. It follows that the level of the output buffer 106, represented by a curve 704 in FIG. 7B, reaches peaks shortly after the presence of large group sizes in the respective frames. FIG. 7B also illustrates an example of a sliding window 705, and of an estimated buffer size shown by a dashed line 706. In particular, as shown by an arrow 708, the buffer size is estimated to peak at a level that exceeds the size limit of the output buffer. There is thus a risk of buffer overflow in the output buffer 106, and for example of a loss of data. The sliding window thus make it possible to take into account such peaks to prevent buffer overflow. In particular, the QP is increased at an early stage to reduce the sizes of the groups of image blocks, and thereby prevent the buffer overflow as shown by the curve 704 in FIG. 7B, which peaks at a level below the size limit 710. Furthermore, using a sliding window permits the QP to be adjusted well in advance of any potential buffer overflow, avoiding sharp fluctuations in the QP.

FIG. 8 is a flow diagram illustrating an example of operations for detecting a scene change according to an example embodiment.

In a first operation 801, high and low thresholds are determined for the size of a current group of image blocks, based on the size of a corresponding group in a previous frame. For example, the corresponding group is the one having the same position in the previous frame as that of the current group in the current frame. The high and low thresholds are for example determined as a percentage of the size of the corresponding group, for example as Old_Size*(1+X) and Old_Size*(1−X), where X is the fraction representing the percentage. The percentage is for example in the range of 20 to 100 percent, and for example at around 50 percent, i.e. X is between 0.2 and 1, for example at around 0.5.

In a subsequent operation 802, the size of the current group is compared to the high and low thresholds.

If neither threshold is exceeded, the next operation is 803, in which a counter is for example decremented, if it has a count value of greater than zero. The method then returns to operation 801 where a next group is processed.

Alternatively, if in operation 802 the high or low threshold is exceeded, in other words if the current group size is lower than the low threshold or higher than the high threshold, the next operation is 804, in which the counter is incremented. In a subsequent operation 805, the count value maintained by the counter is then compared to a limit, and if the limit is not reached, the method returns to operation 801 where a next group is processed. Alternatively, if the limit is reached, it is determined in an operation 806 that a scene change has occurred. The counter limit is for example set to a value of between 2 and 10, depending on aspects such as the size of the groups of image blocks.

The method of FIG. 8 is for example performed for each group of image blocks to be processed.

An advantage of the embodiments described herein is that, by updating the QP to be used for a group of image blocks based on an estimation of the size of one more groups that are still to be encoded, the QP can be adapted during a frame, and the latency can be maintained at a very low level. For example, by controlling the quantization parameter to limit the frame size as described herein, overall latency can be significantly reduced, for example to less than 30 ms, and generally to under 20 ms.

Furthermore, a QP can be determined that is particularly well-adapted to the frame by basing the size estimation on the size of one or more previously encoded groups in a previous frame.

Having thus described at least one illustrative embodiment, various alterations, modifications and improvements will readily occur to those skilled in the art.

For example, it will be apparent to those skilled in the art that the changes applied to the QP when it is determined that a limit for the image slice size has been exceeded will depend on the particular application and on the nature of the QP according to the relevant encoding standard.

Furthermore, it will be apparent to those skilled in the art that the various features described in relation to the various embodiments could be combined, in alternative embodiments, in any combination.

The invention claimed is:

1. A method comprising:
encoding, by a video encoder and based on a first quantization factor (QP), one or more first groups of image blocks of a first video frame;
estimating, by a processing device, the size of an image slice comprising a first plurality of further groups of image blocks to be encoded; and
determining, based on the estimated size of the image slice, a second quantization factor (QP) to be applied to one or more of the further groups of the first plurality of further groups.

2. The method of claim 1, wherein the image slice is a sliding window comprising a fixed number $N_G$ of further groups of image blocks to be encoded, wherein $N_G$ is an integer equal to 2 or more.

3. The method of claim 2, wherein the one or more first groups of image blocks are stored in a buffer, and wherein the method further comprises predicting the occurrence of buffer overflow in said buffer based on the estimated size of the sliding window.

4. The method of claim 2, wherein the further groups of image blocks of the image slice comprise at least one group of image blocks of the first video frame and at least one group of image blocks of a second video frame following the first video frame.

5. The method of claim 2, further comprising:
encoding, based on the second quantization factor (QP), the one or more further groups of image blocks of the first plurality of image blocks; and
estimating, by the processing device, a new size of the sliding window comprising a second plurality of $N_G$ further groups of image blocks to be encoded; and
determining, based on the estimated new size of the sliding window, a third quantization factor (QP) to be applied to one or more of the further groups of the second plurality of further groups.

6. The method of claim 1, wherein the first video frame comprises N groups of image blocks, N being equal to 3 or more, and wherein the further groups of the first plurality comprise N' groups, where N' is less than N.

7. The method of claim 1, wherein estimating the size of the image slice comprises estimating the size of each of the first plurality of further groups of image blocks based on the size of the first group of image blocks.

8. The method of claim 7, wherein the size of each of the further groups of image blocks of the first plurality is estimated by:
identifying, for each further group of image blocks, a corresponding group of image blocks in a previous video frame; and
estimating the size of each further group of image blocks based on the size of its corresponding group of image blocks in the previous frame and on the quantization factor that was used to encode the corresponding group of image blocks, wherein estimating the size of each of the further groups of image blocks is based on the equation:

$$\text{Predicted\_Group\_Size}[g] = \text{Old\_Group\_Size}[g] \times 2^{\left(\frac{Old\_Group\_QP(g)-NewQP}{6}\right)}$$

where Predicted_Group_Size[g] is the size estimation of the further group g, Old_Group_Size[g] is the size of the corresponding group of image blocks in the previous frame, Old_Group_QP(g) is the quantization factor that was used to encode the corresponding group of image blocks, and NewQP is the first quantization factor.

9. The method of claim 8, wherein, for each further group of image blocks, the corresponding group of image blocks is either:
a group of image blocks of the previous frame having the same position in the image as the further group; or
a group of image blocks identified based on one or more motion vectors between image blocks of the previous video frame and image blocks of the first video frame.

10. The method of claim 1, wherein determining the second quantization factor comprises comparing the estimated size of the image slice with an image slice size limit, and reducing or increasing the first quantization factor based on the comparison.

11. The method of claim 1, further comprising:
detecting by the processing device whether or not a scene change occurred between the video frame and a previous video frame by comparing the size of the first group of image blocks with at least one threshold determined based on the size of a group of image blocks in a previous frame corresponding to the first group;
if a scene change is not detected, estimating the size of each further group of image blocks based on the size of a corresponding group of image blocks in the previous video frame; and if a scene change is detected, estimating the size of each further group of image blocks based on the size of one or more encoded groups of image blocks of the current video frame.

12. The method of claim 1, wherein each video frame comprises N groups of image blocks, and wherein the video slice comprises N groups of image blocks.

13. A processing device comprising:
estimator circuitry that determines, based on a first quantization factor (QP) used to encode one or more first groups of image blocks of a first video frame, the size of an image slice comprising a first plurality of further groups of image blocks to be encoded; and
rate control circuitry that determines, based on the estimated size of the image slice, a second quantization factor (QP) to be applied to one or more of the further groups of the first plurality of further groups.

14. A video transmission circuit comprising:
a video encoder adapted to compress a video signal based on quantization parameter;
the processing device of claim 13 for providing the quantization parameter; and
an output buffer for storing the compressed video signal.

15. A video transmission system comprising:
the video transmission circuit of claim 14, wherein the video signal is provided by a capture device;
a receive circuit coupled to the video transmission circuit by a transmission interface, the receive circuit comprising:
an input buffer for receiving the compressed video signal;
a decoder for decoding the compressed video signal to generate a decompressed video signal; and
a display for displaying the decompressed video signal.

16. A video transmission circuit comprising:
a video encoder adapted to compress a video signal based on quantization parameter;
a processing device for providing the quantization parameter, adapted to estimate, based on a first quantization factor (QP) used to encode one or more first groups of image blocks of a first video frame, the size of an image slice comprising a first plurality of further groups of image blocks to be encoded, and to determine, based on the estimated size of the image slice, a second quantization factor (QP) to be applied to one or more of the further groups of the first plurality of further groups; and
an output buffer for storing the compressed video signal.

17. A video transmission system comprising:
the video transmission circuit of claim 16, wherein the video signal is provided by a capture device;
a receive circuit coupled to the video transmission circuit by a transmission interface, the receive circuit comprising:
an input buffer for receiving the compressed video signal;
a decoder for decoding the compressed video signal to generate a decompressed video signal; and
a display for displaying the decompressed video signal.

* * * * *